Figure 1:
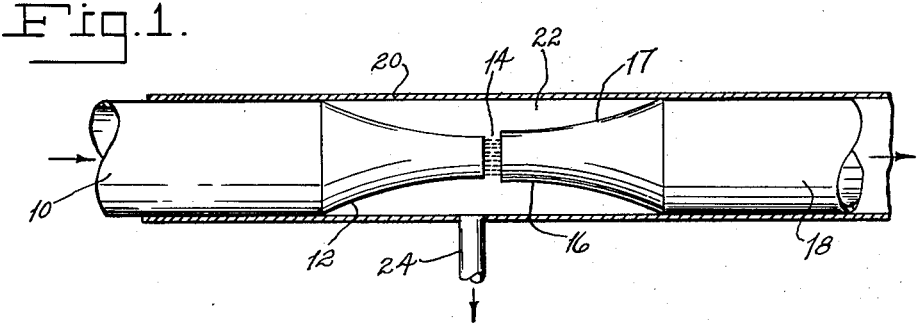

Aug. 19, 1952  S. P. DICKENS ET AL  2,607,439
SEPARATION OF GASES FROM MIXTURES THEREOF
Filed July 28, 1948

INVENTORS
SAMUEL P. DICKENS
CHARLES A. COGHLAN
PHILIP G. MORROW
BY Daniel Stryker
J. H. Grahame
ATTORNEYS Patented Aug. 19, 1952

2,607,439

UNITED STATES PATENT OFFICE 2,607,439

SEPARATION OF GASES FROM MIXTURES THEREOF

Samuel P. Dickens, Charles A. Coghlan, and Philip G. Morrow, Port Arthur, Tex., assignors to The Texas Company, New York, N. Y., a corporation of Delaware Application July 28, 1948, Serial No. 41,016

8 Claims. (Cl. 183—115)

The present invention relates to the separation of mixed gases of different molecular weights, and more specifically, contemplates the selective recovery or concentration of component gases by virtue of preferential molecular escape or diffusion of the lighter molecular weight constituent form the surface of an unconfined, flowing column of a gas mixture.

In particular, the present invention contemplates diffusion from a free or unconfined surface set up by traversing a column of mixed gases through a diffusion zone under sufficient momentum to maintain predetermined columnar form and prevent substantial diversion of gross flow from the predetermined path of the column.

In accordance with the present invention, a column of mixed gas, comprising gases of relatively different molecular weights, is caused to flow through a separating zone of substantially larger section, thus exposing a free, unconfined area of its periphery. The column is maintained in the form of an integral, unitary stream of smaller cross-section than the separating zone by projecting it at a substantial velocity in the form of a jet or similar hydrodynamic mass flow stream. For example, mixed gases flowing through a conduit at a substantial velocity pass a laterally open section of substantial area during which the column maintains its predetermined unitary, integral form by virtue of its momentum of flow; that is to say, the periphery of the column or jet occupies a well-defined boundary surface in spite of the absence of a confining wall, and thus exposes a free or unconfined surface which may be of substantial area.

Gas is continuously permitted to diffuse from the free surface of the moving column into an adjacent collection space, from which it is continuously drawn off. The residue of the mixed gases is separately recovered downstream in the direction of flow of the column.

It has been found, in accordance with the present invention, that the diffusion product thus recovered from the free surface of the moving column is substantially enriched with respect to the gas of lower molecular weight, whereas the residual stream of the mixed gases is correspondingly enriched with respect to the gas or gases of higher molecular weight. Thus, substantial concentration of the respective gases is realized. Presumably, this follows from the fact that the lighter molecules, moving as they do at a materially increased, absolute molecular velocity, tend to reach the free boundary surface of the column at a greater frequency than do the molecules of the heavier weight gas and accordingly escape with greater frequency into the separating zone.

By maintaining a somewhat lower pressure in the separating zone than in the moving column of mixed gases, continual recovery of the separated lighter weight components is realized, with simultaneous enrichment of the residual main stream as regards the gas of greater molecular weight. It is therefore feasible to provide a cascade for progressive purification or concentration of the desired constituent or constituents, to any required extent.

It has hitherto been proposed to effect separation of mixed gases by passage along a diffusion barrier having minute capillary passages sufficiently constricted to prevent hydrodynamic mass flow and thus permit diffusion of the lighter gas to become a dominant factor, at moderate pressure differentials. Such capillary passages are accordingly restricted to a dimension of the order of the mean free path of the gas molecules, and the process accordingly tends to be relatively slow, even with the provision of extensive diffusion surfaces. With moderately large pore diameter membranes, the use of subatmospheric pressures is required (to increase mean free path), resulting in only small throughput per unit of equipment volume.

In accordance with the present invention, however, selective separation is effected from a relatively extensive, free surface maintained by causing the mixture to issue with substantial momentum through the separation zone as a unitary column or jet having a substantial velocity in a predetermined, preferably overall, straight-line direction. As a result, the use of a separating or diffusion diaphragm is not only obviated, but the diffusion zone is completely unimpeded, and separation takes place freely and almost instantaneously across a free or open peripheral surface of substantial area. That is to say, the free diffusion or separation surface contemplated will possess an uninterrupted area far in excess of anything contemplated from the standpoint of a capillary of a diffusion barrier, and actually as great as that necessary to effect the required separation.

It is extremely important to note that the present invention results in free separation or escape of the desired fraction from a free and moving surface such that the effect becomes surprisingly rapid.

From the foregoing, it is apparent that the mixed stream from which separation is to be effected must be moved at a linear rate effective to maintain unitary integrity of the column past the gap or unconfined region provided for separation. In addition, it is usually desirable to increase the linear velocity to a value such that the separated gases may be withdrawn from the vicinity of the free surface under a pressure somewhat below that of the moving column without affecting the surface integrity thereof, namely, such that the space adjacent the periphery of the moving stream may be maintained at a pressure effective not only to prevent aspiration into the stream, but actually to effect positive flow of diffused product gases therefrom without causing any material hydrodynamic flow across the free surface.

Figure 2:
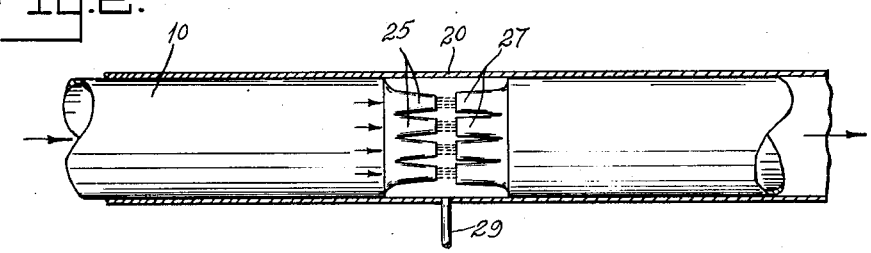

Reference to the attached drawing is had for the purpose of more specifically illustrating the invention by preferred embodiments involving Figure 1, which is a more or less diagrammatic, sectional view of a single separator involving the features of the invention; Figure 2, a modified form thereof; and Figure 3, a symbolic flow representation of a cascaded arrangement of separators.

Referring to Figure 1, numeral 10 indicates a flow conduit continuously supplying a stream of mixed gases in the direction of the arrow from a source not shown. As above indicated, the mixed stream may comprise any mixture of gases of different molecular weight; for example, hydrogen and carbon dioxide. The flowing stream, as indicated, meets a nozzle or constriction of tapering or frusto-conical form, as at 12, and accordingly increases substantially in velocity and is ejected as a jet or unitary column 14 across a gap or open space at the extremity of the nozzle. Although a tapering nozzle is wasteful of energy, the constriction may comprise a simple orifice with an axially centered collecting space about its outlet.

In the embodiment shown, the column or jet is received by the mouth of a coaxial tube 16 which gradually flares as at 17, and ultimately increases to the diameter of the downstream or outlet conduit 18.

Thus, the column or jet 14 is projected past a gap or laterally unconfined zone at a rate such that it maintains its unitary, integral columnar form, and accordingly presents free or unconfined peripheral surfaces from which molecules of the mixture diffuse or escape under the impetus of their absolute molecular velocity.

To permit recovery of the separated gas, a coaxial tube 20 embraces the walls of the conduits 10 and 18, providing an enclosed space 22 about the free peripheral surfaces of the jet, and is provided with an outlet 24. The outlet 24 preferably connects with a suitable suction pump or other gas withdrawal instrumentality not shown, capable of maintaining pressure such as to effectively overcome aspiration and effect continual withdrawal of the diffusion products out of zone 22. As a result, the composition of the gases withdrawn through the side arm 24 reflects the absolute molecular velocity of the component gases and accordingly is concentrated in respect to the gases of lower molecular weight.

For example, upon passage of a gas mixture composed of 56.1 per cent $N_2$ and 43.9 per cent $H_2$ through a jet of the general form disclosed in Figure 1, the diffused product withdrawn from the space about the surfaces of the jet is found to have a composition approximately as follows:

| | Per cent |
|---|---|
| $N_2$ | 31.5 |
| $H_2$ | 68.5 |

The modified embodiment of Figure 2 subdivides the flow of gas into a plurality of jets or columns such that the total area of free diffusion surface is substantially increased. To this end, the stream within conduit 10 is directed into a multiplicity of nozzles 25, preferably uniformly distributed over the cross section of the conduit and coaxially aligned with correspondingly spaced receiving orifices 27, provided for individual reception of the respective flows. As in Figure 1, each of the nozzles 25 and reception orifices 27 are preferably formed to facilitate flow and minimize mechanical losses. The diffused product gas is removed from the separating zone through outlet pipe 29 which leads to the inlet side of a suction pump not shown.

Figure 3:
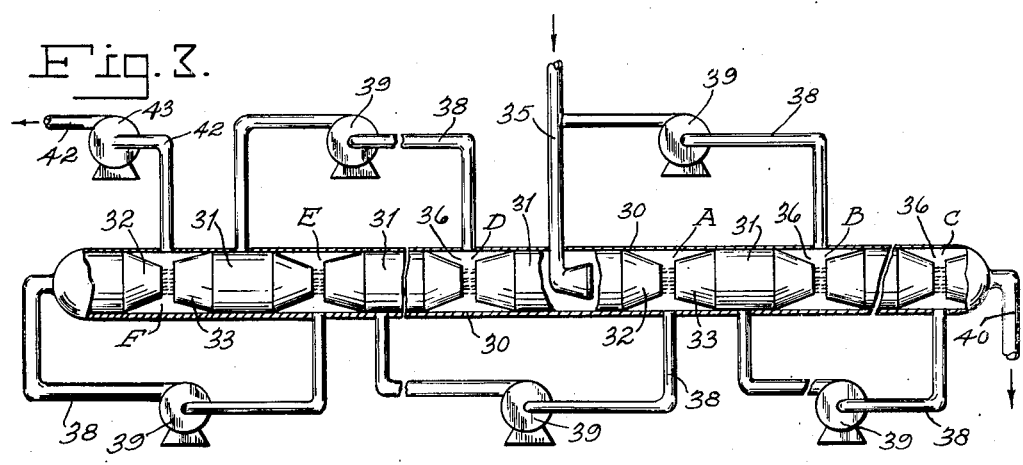

Referring now to Figure 3, there is disclosed a cascade arrangement of separating units embodying an outer tube 30 embracing longitudinally spaced inner tubes or conduits 31, each provided with a nozzle extremity 32 and an opposite receiving orifice 33. The mixture, comprising, for example, about equal parts of the gases to be separated, is brought into a centrally disposed conduit section 31, as indicated, via inlet pipe 35, and successively passes the following nozzles. Thus, the stream of gas is successively projected at increased rates across open spaces where diffusion occurs from the free, unconfined surfaces of the moving column or jet into the adjacent recovery spaces 36. In each case, the column traverses a separation zone with its periphery exposed to the adjacent recovery space.

The diffused product gas from the first diffusion zone is withdrawn continuously through respective pipe 38, each provided with a pump 39, and recycled or returned to the main stream at a point in advance of the separating zone from which it is withdrawn.

Preferably, the withdrawn stream is returned to a point in the main stream at which the composition is substantially the same. Thus, in the embodiment more or less diagrammatically shown, each separated stream is returned to a point in the main stream prior to the preceding separating zone.

For example, the separated product gas being withdrawn from the separating zone or recovery space designated by the letter A is relatively enriched in the gases of lighter molecular weight, as compared with incoming gas in pipe 35, and is introduced into the main flow in advance of the separating zone D. The main stream traversing diffusion zone B has been partially denuded of lighter weight gases in zone A, and accordingly, the separated gas recovered therefrom is substantially less rich in the lighter molecular weight component. Actually it has a composition approximating that of the fresh feed. Accordingly, it is introduced into pipe 35. For the same reason, the column injected across the chamber C, after having been progressively denuded of light molecular weight gas in zones A and B, yields a separation product approximating the composition of the main stream leaving zone A. Accordingly, it is returned to a point just in advance of zone B.

The final residue of the main stream, discharged through pipe 40, is accordingly rich in the heavier molecular weight constituents.

In advance of the inlet pipe 35, separation zones D, E and F are similarly provided with a continuous flow of gas which is of progressively increasing percentage of lighter molecular weight constituent in the left hand direction, as viewed in the drawing.

For example, the product withdrawn from zone D results from preferential separation practiced upon a main stream enriched as in zone A, and accordingly is yet further concentrated as regards the lighter molecular weight constituent. This is fed to a point in advance of the zone E and the additionally enriched separation product thereof continuously returned to a point in advance of zone F. In this way, the product withdrawn from zone F through pipe 42 by pump 43 is of highest concentration as regards the lighter gas.

Thus, outlets 42 and 40 deliver respectively the concentrated streams of the lighter and heavier molecular weight constituents of the mixture. It is to be understood of course that the flow diagram of Figure 3 is merely diagrammatic and is not intended to take into account the specific dimensions desirable for maximizing efficient operation. Obviously, the volume of gas handled is not the same in each separation zone and in efficient practice it will be desirable to design the system accordingly.

So, also, it is to be appreciated that the ideal prior point of introduction of the separated product into the main stream may vary depending on the gases being separated and the resulting general operating efficiency and effectiveness of the separating zones or stages.

As above stated, the velocity of the jet through each stage is sufficient to overcome the disruption of the unitary, integral column and thus provide a free diffusion surface. In addition, it is particularly advantageous to maintain a stream velocity such that the interior of the column is in a condition of turbulent stream flow. That is, the flow is preferably beyond the so-called critical velocity and the entire mass of gas continuously sweeps past the bounding surfaces of the stream. It is as a result of this condition that the peripheral or bounding surfaces of the column are continuously replenished with gas from the central portion of the stream so that the desired diffusion of the lighter component is maximized. Stated in another way, surface depletion in molecules of lighter molecular weight which would otherwise occur as the result of progressive peripheral escape from the free surfaces is prevented by the continual turbulent presentation of fresh gas to the peripheral surface.

It is to be understood that the term "turbulent flow" as used herein means the turbulence occurring during high speed flow of a fluid in a predetermined, usually straight-line, overall direction.

While the foregoing disclosure has mentioned, by way of illustration, the separation of certain gas mixtures, the invention is obviously not so limited, but is broadly applicable to the treatment of any mixtures of gases of different molecular weight. From the foregoing, it is apparent that separation occurs more readily where the difference in molecular weight is substantial, as for example, in separating hydrogen from carbon dioxide or the like. On the other hand, separation may be readily effected between hydrogen and carbon monoxide, between hydrogen and methane, between hydrocarbon gases such as methane and ethane, between such a hydrocarbon and carbon dioxide, or between the oxygen and nitrogen of air.

The column and accordingly the separating surface of mixed gases may take widely varying physical shape and form, for example, that of a jet, cylinder, sheet or the like. Morever, while straight-line flow is usually preferable in maintaining integrity of the column, flow through a curved path may be permissible, as for example, where the peripheral free diffusion surfaces are disposed on the inner side of the curve.

Obviously, many modifications and variations of the invention as set forth above may be made without departing from the spirit and scope thereof and therefore only such limitations should be imposed as are indicated in the appended claims.

We claim:

1. In the separation and concentration of mixed gases of different molecular weight, the steps which comprise setting up a confined moving stream of said mixed gases, jetting said stream in a predetermined line of flow through a substantially unconfined separating zone subject to a reduced pressure as a moving column of flow of substantial momentum resistant to lateral deflection, exposing a substantial area of the periphery of said column as a free, unconfined surface in said separating zone, continually maintaining the predetermined, unitary integrity of said free surface by the velocity and momentum of flow of said column, continuously effecting selective molecular diffusion of gas through said free surface into said separating zone, continuously recovering from said separating zone product gas escaping from said free surface, rich in respect to said gas of lower molecular weight, and separately recovering the residual flow of said column beyond said separating zone as a product relatively rich in said higher molecular weight gas.

2. The method according to claim 1, wherein said stream is passed in series through a plurality of said separating zones with recovery of diffused product gas from each zone.

3. The method according to claim 1, wherein said stream is passed in series through a plurality of said separating zones with recovery of diffused product gas from each zone, and wherein thus recovered gas from later separating zones in the series is returned to the said stream in advance of the separating zone from which it is recovered.

4. The method according to claim 1, wherein said column of gas in the separating zone is moved at a velocity to effect substantial internal turbulence.

5. The method according to claim 1, wherein said column of gas in the separating zone is moved at a velocity to effect substantial internal turbulence in an overall, substantially straight-line direction.

6. The process for the separation of mixed gases of different molecular weight which comprises setting up a confined moving stream of said mixed gases, projecting said stream along a predetermined line of flow as a unitary, integral column of substantial momentum resistant to lateral deflection, passing said moving column through a substantially unconfined separating zone subject to a reduced pressure, presenting a substantial area of the peripheral surface of said column to said separating zone as a free, continuously moving surface, preventing substantial hydrodynamic diversion of the column across said surface by virtue of the momentum of flow of said column, continuously effecting diffusion of gases through the unconfined surface of said moving column of gas traversing the separating zone, and continuously recovering from said separating zone diffused gases rich in said gaseous constituent of lower molecular weight.

7. The method of separating and concentrating different molecular weight gases from a mixture thereof which comprises setting up a confined moving stream of said mixed gases, passing said stream along a predetermined line of flow to form a moving column of substantial velocity resistant to lateral deflection, passing said column through a laterally open and substantially unconfined separating zone subject to reduced pressure, continuously maintaining the predetermined peripheral integrity of said column in said substantially unconfined separating zone by the momentum thereof, thereby providing a free, unconfined peripheral surface of substantial area, causing gas to separate by diffusion through the free surface of the moving column, withdrawing separated gas from the vicinity of said free surface as a product stream rich in gas of lower molecular weight, and recovering residual mixed gases of said column beyond said open section, as a product stream rich in gas of higher molecular weight.

8. The method of separating and concentrating mixed gases of different molecular weight which comprises causing a mixture of said gases to traverse a substantially unconfined diffusion zone subject to a reduced pressure as a column having unconfined peripheral surface portions of substantial area under an imposed momentum sufficient to maintain the predetermined, unitary, columnar form resistant to diversion from said predetermined path, causing gas to selectively separate through said unconfined peripheral surface by diffusion, and withdrawing the diffused products from the vicinity of said surface.

SAMUEL P. DICKENS.
CHARLES A. COGHLAN.
PHILIP G. MORROW.

REFERENCES CITED

The following references are of record in the file of this patent:

UNITED STATES PATENTS

| Number | Name | Date |
|---|---|---|
| 1,496,757 | Lewis et al. | June 3, 1924 |
| 2,255,069 | Maier | Sept. 9, 1941 |

FOREIGN PATENTS

| Number | Country | Date |
|---|---|---|
| 270,286 | Great Britain | Apr. 23, 1927 |